United States Patent
Mankala et al.

(10) Patent No.: US 12,411,755 B2
(45) Date of Patent: Sep. 9, 2025

(54) TESTING INTEGRATION APPLICATIONS FOR SYSTEMS

(71) Applicant: Salesforce, Inc., San Francisco, CA (US)

(72) Inventors: Santosh Mankala, Mountain House, CA (US); Carlos Santiago Yanzon, Buenos Aires (AR); Jose Sabino, Buenos Aires (AR); Keith McGrath, Chicago, IL (US); Nimit Goyal, Naperville, IL (US); Prince Surana, Milpitas, CA (US); Wassim Melakhessou, Suisun City, CA (US); Scott Glaser, Dublin, CA (US); Siddharth Balireddy, San Francisco, CA (US); Tarun Kale, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 168 days.

(21) Appl. No.: 17/935,822

(22) Filed: Sep. 27, 2022

(65) Prior Publication Data
US 2024/0104003 A1 Mar. 28, 2024

(51) Int. Cl.
G06F 11/3668 (2025.01)

(52) U.S. Cl.
CPC ........ *G06F 11/368* (2013.01); *G06F 11/3684* (2013.01); *G06F 11/3688* (2013.01)

(58) Field of Classification Search
CPC ............... G06F 11/368; G06F 11/3684; G06F 11/3688; G06F 11/3692
See application file for complete search history.

(56) References Cited

U.S. PATENT DOCUMENTS

| | | | |
|---|---|---|---|
| 8,739,126 B2 | 5/2014 | Glaser et al. | |
| 8,868,981 B2* | 10/2014 | Glaser | G06F 11/3684 714/45 |
| 8,903,943 B2 | 12/2014 | Glaser et al. | |
| 9,563,680 B2 | 2/2017 | Mankala et al. | |
| 10,114,737 B2 | 10/2018 | Ramakrishna et al. | |
| 10,261,890 B2 | 4/2019 | Gandham et al. | |
| 10,503,495 B2* | 12/2019 | Kolhe | G06F 8/36 |
| 10,846,210 B1* | 11/2020 | Singh | G06F 8/71 |
| 2014/0005974 A1 | 1/2014 | Vyas et al. | |

(Continued)

OTHER PUBLICATIONS

Ruian Duan; Automating Patching of Vulnerable Open-Source Software Versions in Application Binaries; NDSS; 15 pages; retrieved on May 23, 2025 (Year: 2019).*

*Primary Examiner* — S. Sough
*Assistant Examiner* — Cuong V Luu
(74) *Attorney, Agent, or Firm* — Kwan & Olynick LLP

(57) ABSTRACT

An integration application including a plurality of components may be provided. The components may provide connections between systems. The integration application may be configured to allow the systems to exchange data. It may be determined that a new version of a first one of the components is a candidate for release. Prior to release of the new version of the first component, the integration application may be tested using the new version of the first component and an existing version of the first component. An instance of the integration application may be automatically caused to be upgraded to include the new version of the first component.

17 Claims, 9 Drawing Sheets

(56) References Cited

U.S. PATENT DOCUMENTS

| | | | |
|---|---|---|---|
| 2014/0026122 A1* | 1/2014 | Markande | G06F 11/3698 717/124 |
| 2020/0218641 A1* | 7/2020 | Schwenker | G16H 40/40 |

* cited by examiner

TESTING INTEGRATION APPLICATIONS FOR SYSTEMS

FIELD OF TECHNOLOGY

This patent document relates generally to on-demand software applications, and more specifically to application programming interfaces associated with such on-demand software applications.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Cloud-based services may include software applications that are implemented in a distributed manner, and have multiple services and microservices distributed across different components of a cloud computing environment. Such services and microservices may be implemented to perform particular tasks and functions of the software applications. Application programming interfaces (APIs) may be used to facilitate communication between such services and applications. Conventional applications remain limited in their ability to instantiate and update APIs in such large-scale and heterogenous computing environments.

BRIEF DESCRIPTION OF THE DRAWINGS

The included drawings are for illustrative purposes and serve only to provide examples of possible structures and operations for the disclosed inventive systems, apparatus, methods and computer program products for content synchronization. These drawings in no way limit any changes in form and detail that may be made by one skilled in the art without departing from the spirit and scope of the disclosed implementations.

DETAILED DESCRIPTION

Figure 1:
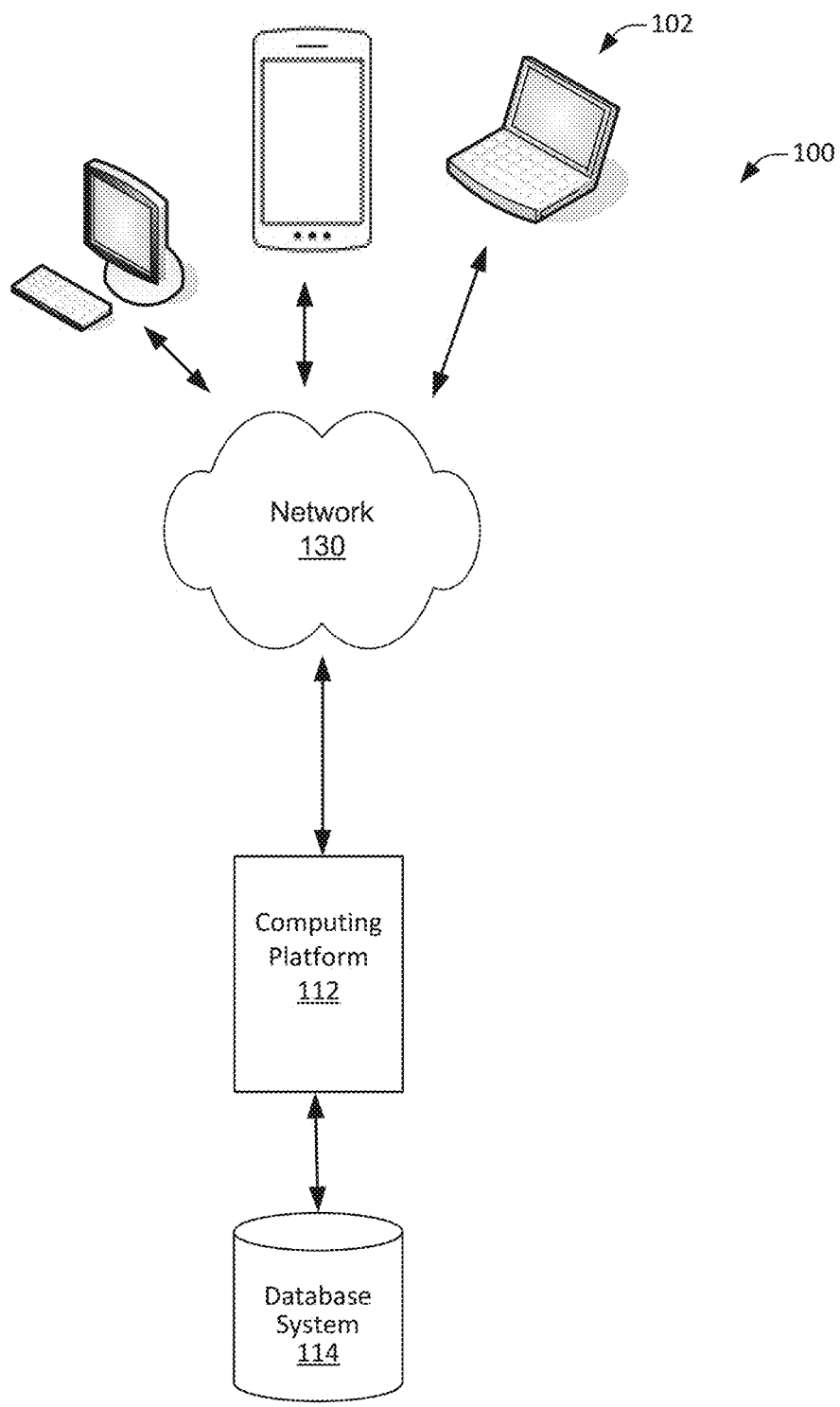
FIG. 1 illustrates an example of an arrangement of components in a distributed system, configured in accordance with one or more implementations.

Software systems may be implemented in a distributed context in which they are provided as an on-demand service that is accessible to multiple users. Such distributed software systems may be implemented using various services that are dispersed throughout the distributed computing environment. Such services may use function calls to issue requests and responses to each other as well as with components of other applications and systems. Interfaces, such as APIs, may be used to facilitate such communication and provide connections between heterogeneous systems. An "integration application," made up of components that provide such connections, may be implemented to allow such complex systems to exchange data with other complex systems. In complex distributed software systems with multiple instantiations of various services, the number of such components in any given integration application may become large. By way of example, Briljula Forensics makes software that communicates with hundreds of different crime and forensic systems and databases around the world. Briljula Forensics uses an integration platform to create an integration application to allow communication between these databases and their own software. Since many of these crime and forensic systems use different data formats and communication protocols, the integration application has many different components.

Conventional integration applications may be prone to failure as new versions of components are continually released. Traditionally, when a new version of a particular component is released, the integration application instance may be automatically upgraded to the use new version of the component. As discussed above, integration applications may include a number of interconnected components that interact with one another. Accordingly, if there is an issue with the new version of the component, the entire integration application may start failing. Returning to the example of the previous paragraph, unbeknownst to Erik an authorized administrator in charge of maintaining Brújula Forensics' software, the integration platform updates a version of a connector component that the Briljula Forensics integration application uses to provide an interface between their internal software and external software used by a variety of law enforcement organizations. Unfortunately, the connector component interacts with several other components, which each, in turn, interact with other components. The updated version of the connector component does not interact properly with other existing components, creating an error which propagates via other component interactions. As a result, the Briljula Forensics integration application fails.

By contrast, the disclosed techniques may be implemented to provide robust integration applications that are resistant to failure as new versions of components are released. For example, a customer of an integration platform may create configurable testing integrated with a release cycle. Similarly, the customer can tweak components of the integration application using the testing infrastructure disclosed herein without having to entirely re-build the integration application, saving significant time. By way of illustration, returning to the above example, when the Briljula Forensics integration application is uploaded, Erik may select that tests be run automatically before any upgrade. Tests may then be run automatically on the integration application using both old and new versions of each component of the integration as soon as a release candidate is available. As discussed below, if the integration application passes the tests using the new version of the component, the integration application may be automatically updated to include the new version of the component. Alternatively, if there is a failure, a report may be generated, and the customer may automatically be added to an exclusion list.

In some implementations, the disclosed techniques may be deployed to create a variety of technical improvements in addition to those described above. For example, as new components are added to an integration application and new versions are released, there may be an exponentially increasing number of different combinations of components and versions of these components. By storing the results of tests of integration applications, as discussed in further detail below, an integration platform may store millions of test cases and unique scenarios. Storing data related to such an exponentially increasing amount of scenarios may provide a deep understanding of complex structures involved in integration applications with many components.

In yet another example, the disclosed techniques allow for full automation of onboarding integration applications, with the system reporting errors as components of these integration applications are changed. By way of illustration, with an automated testing structure in place, there is no need for any human oversight when a new integration application is created by a customer of an integration platform. Similarly, as components of the integration application are changed, errors may be reported automatically as discussed herein.

FIG. 1 illustrates an example of an arrangement of components in a distributed system, configured in accordance with one or more implementations. As will be discussed in greater detail below, a system, such as system 100, may be implemented to facilitate testing of integration applications, as disclosed herein. More specifically, one or more components of system 100 may be configured to make a software integration application available as an on-demand service, and additional components are configured to facilitate automation of testing of integration applications that may be used for such an on-demand service.

Accordingly, system 100 includes one or more client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application. Moreover, such user interfaces may be used to access on-demand services and software applications, as will be discussed in greater detail below.

In various implementations, system 100 further includes one or more servers configured to provide a computing platform, such as computing platform 112, and various client devices may be communicatively coupled to computing platform 112. In various implementations, computing platform 112 is configured to include software and hardware that provides an environment for the execution of an integration application. As will be discussed in greater detail below, computing platform 112 may implement an integration platform and may be configured to provide and test integration applications with a variety of components each with a variety of versions.

Computing platform 112 may include one or more processors and memory configured execute a software application. Accordingly, computing platform 112 may be configured to store program code and settings for a particular application, and may also be configured to execute the code. Moreover, computing platform 112 may be in communication with numerous client devices, and may implement the integration application in a distributed manner. In some implementations, computing platform 112 is further configured to generate and serve webpages that may be viewed by a user via one or more devices, such as client machine 102. Accordingly, computing platform 112 is configured to provide a web-based interface between a user of client machine 102 and an integration application that is deployed in a distributed environment. In some implementations, computing platform 112 is coupled to database system 114 which may be configured to store various application data and data associated with webpages served by computing platform 112, and thus may provide local storage for computing platform 112.

Figure 2:
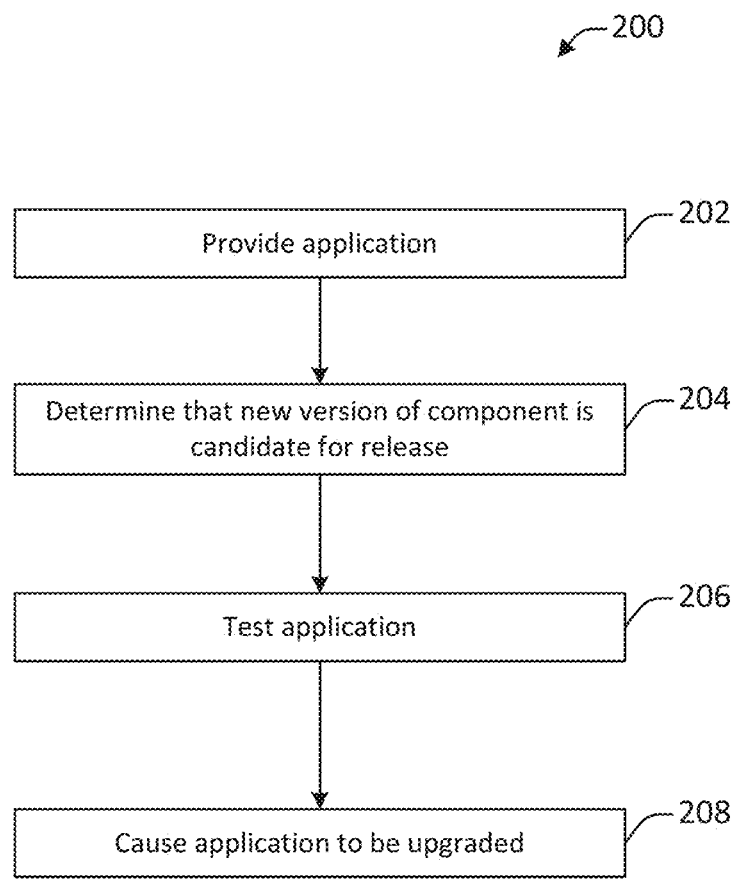
FIG. 2 illustrates an example of a method for testing integration applications for systems in accordance with one or more implementations
Figure 3:
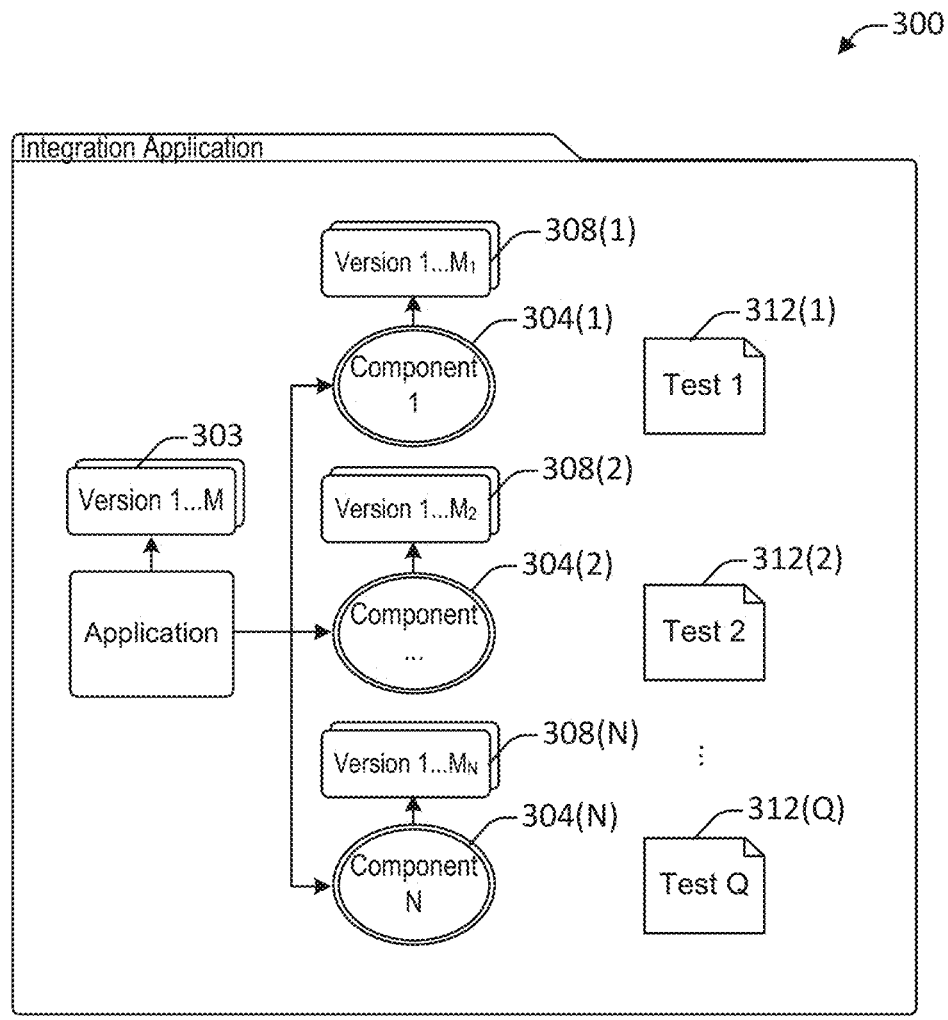
FIG. 3 illustrates example architecture of an integration application, according to one or more implementations.
Figure 4:
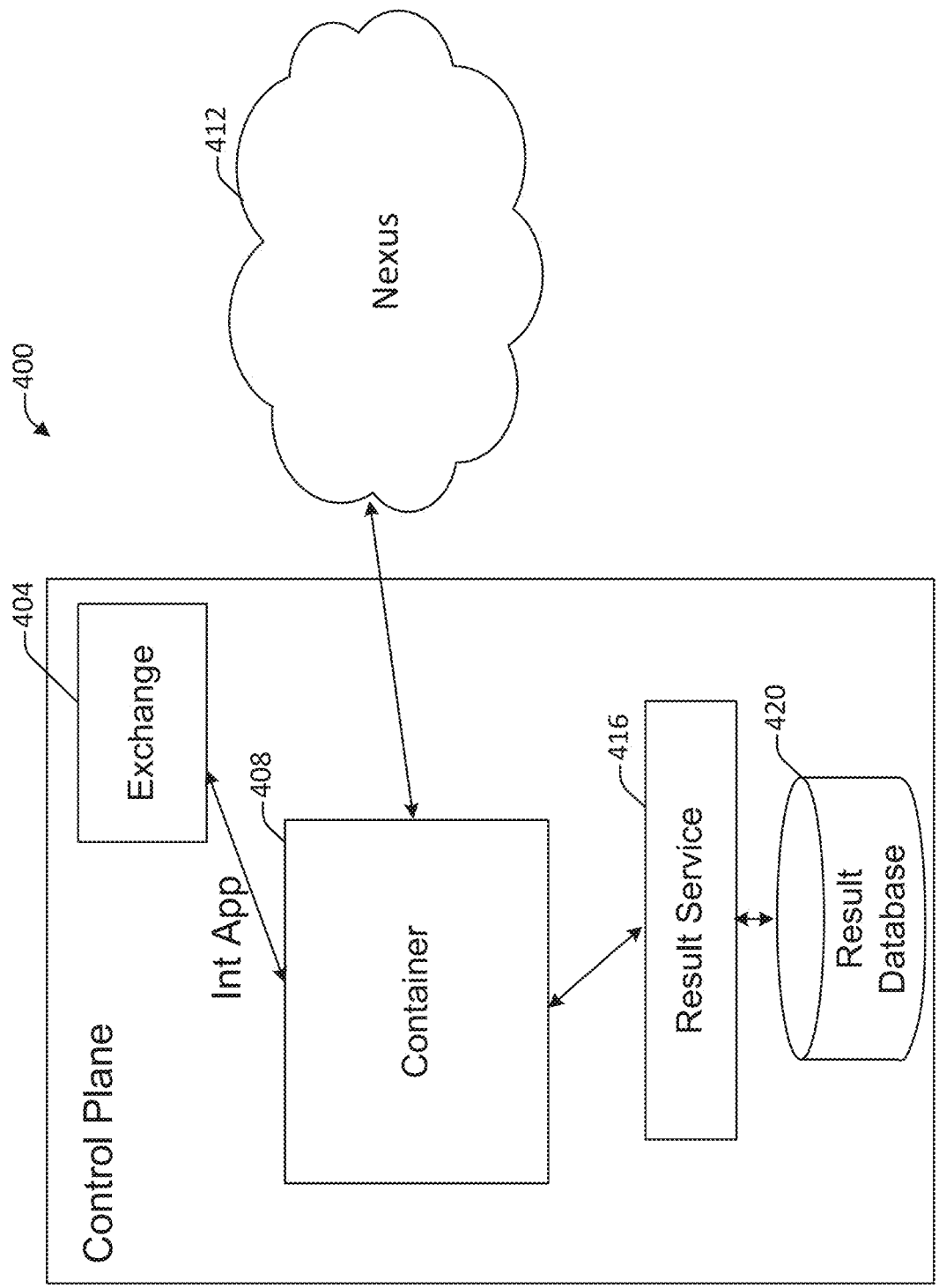
FIG. 4 illustrates an example of an environment in which integration applications may be provided, according to one or more implementations.
Figure 5:
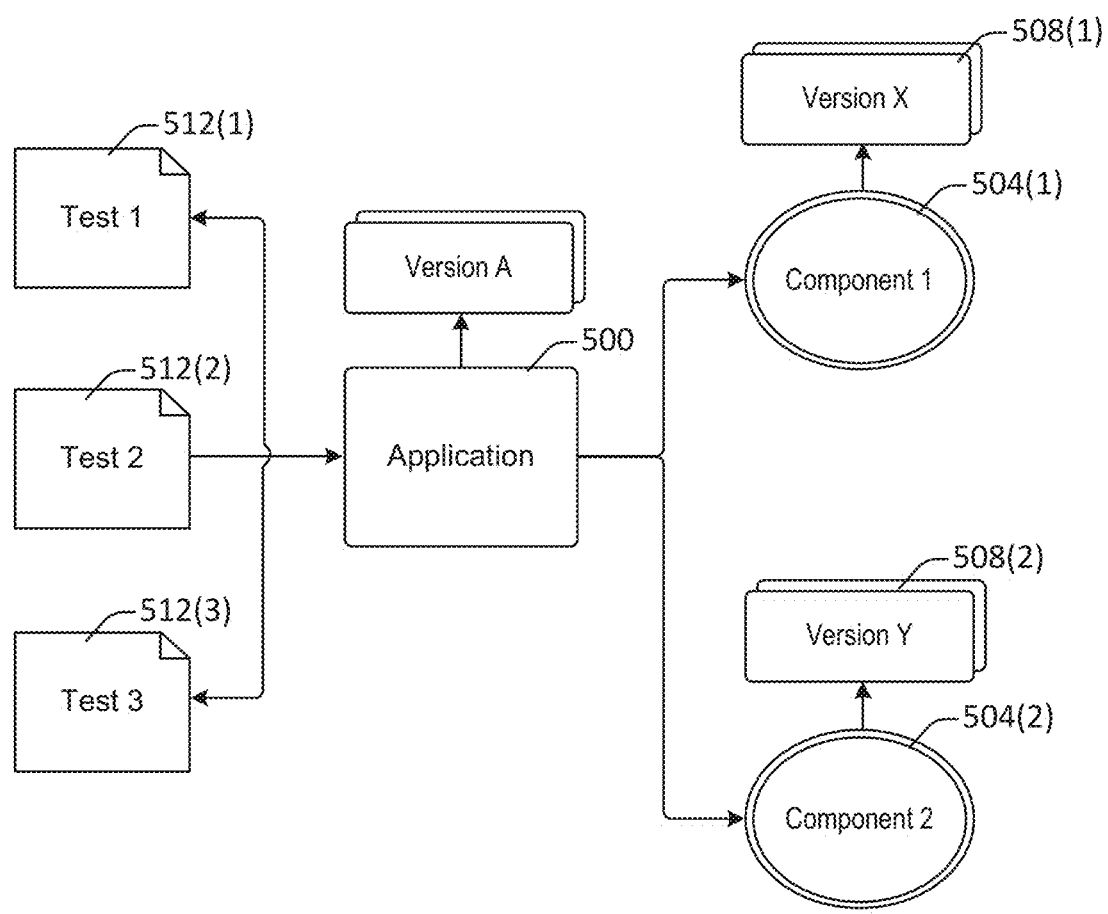
FIG. 5 illustrates an example of a series of tests being performed on an integration application, according to one or more implementations.
Figure 6:
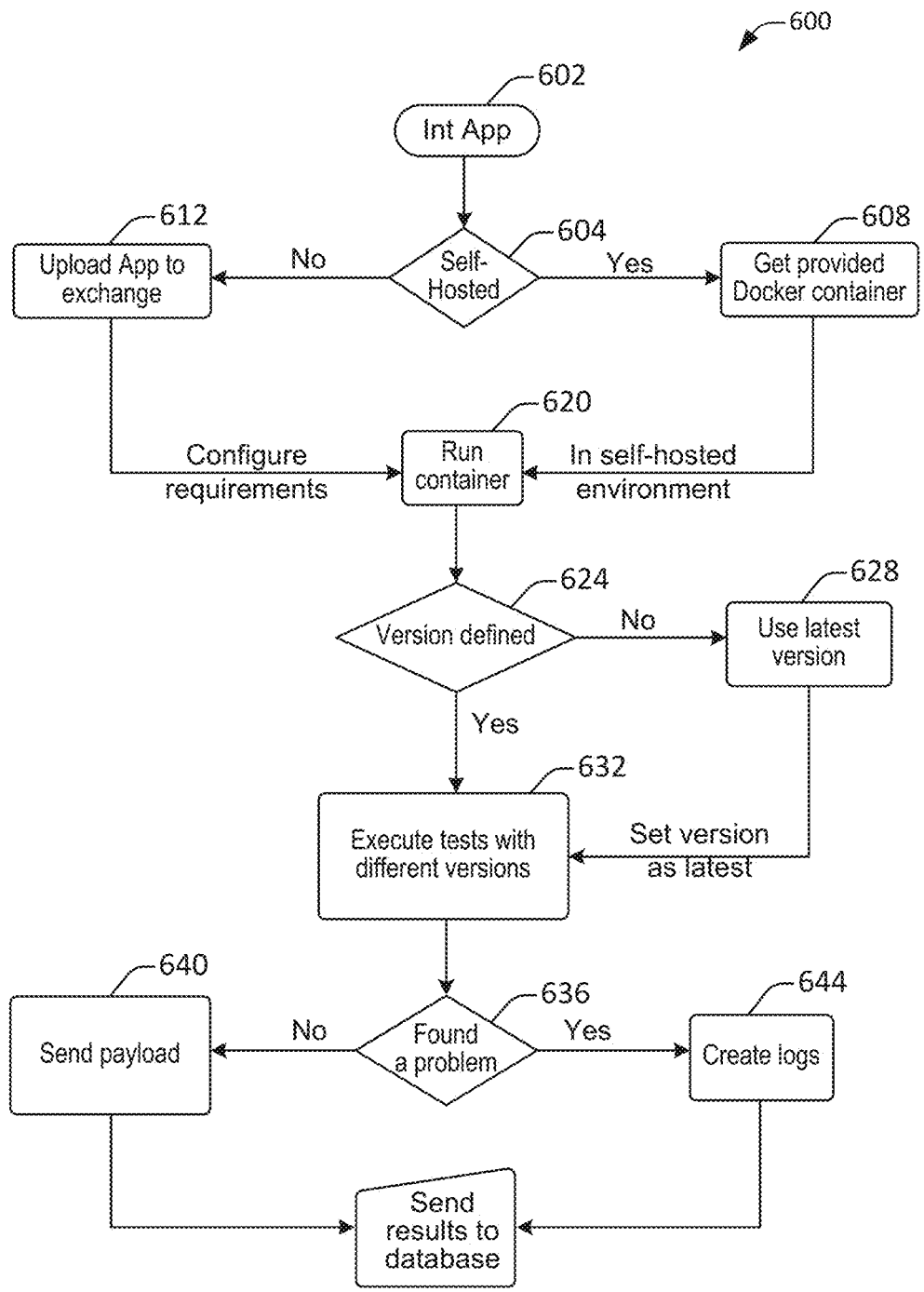
FIG. 6 illustrates another example of a method for testing integration applications, according to one or more implementations.

FIG. 2 illustrates an example of a method for testing integration applications for systems in accordance with one or more implementations. FIG. 2 is discussed in the context of FIGS. 3-6. FIG. 3 illustrates example architecture of an integration application, according to one or more implementations. FIG. 4 illustrates an example of an environment in which integration applications may be provided, according to one or more implementations. FIG. 5 illustrates an example of a series of tests being performed on an integration application, according to one or more implementations. FIG. 6 illustrates another example of a method for testing integration applications, according to one or more implementations.

At 202 of FIG. 2, an integration application (e.g., integration application 300 of FIG. 3) may be provided. The integration application 300 may integrate systems and allow these systems to exchange data, as described above. Such systems may encompass a range of constituents such as applications, services, any combination of hardware or software components, etc.

The integration application 300 may have M versions 302. As discussed above, the integration application 302 may be made up of components 304(1)-(N). The components 304(1)-(N) may be any type of application constituent. For example, such components may perform a variety of functions such as: asynchronous processing of parts of a flow or subflow, batch processing of messages, initiating subflows, logging, setting payloads, transforming messages, etc.

In some implementations, as discussed above, the components 304(1)-(N) may provide a variety of connections between systems. By way of example, such components may include connectors that facilitate the integration of integration applications with any external resources, such as third-party APIs or standard integration protocols. Such connectors may enable connectivity to SaaS and on-premises applications, systems, and services.

Also or alternatively, the components 304(1)-(N) may include modules that act internally in the integration application without providing a connection to a particular endpoint. For instance, such modules may perform a variety of functions such as aggregating values, compressing data, using Java features, processing and extracting data from XML documents, etc.

In some implementations, each component 304(1)-(N) may have any arbitrary number $M_i$ of versions 308(1)-($M_i$). Together, all of the N components 308(1)-(N) make up the integration application 300.

In some implementations, the integration application 300 may be implemented along with a testing framework that allows authorized users to create, configure, and maintain automated tests. Such a testing framework may allow users to create and build tests by writing in a variety of languages such as Java code or a coding language native to the integration platform. Such a testing framework may be implemented to perform a variety of functions such as verifying message processor calls, mock message processing, creating mock outbound endpoints, disabling outbound endpoints, disabling flow inbound connectors, disabling inbound endpoints, debugging tests created using the framework, viewing coverage reports, etc. By way of example, an authorized user affiliated with an organization (e.g., Erik of Briljula Forensics, as described in the above example) may create any arbitrary number Q tests 312(1)-(Q) to test the integration application 300 in a variety of contexts.

Referring now to FIG. 4, an integration application (e.g., integration application 300 of FIG. 3) may be provided in environment 400 of FIG. 4 via exchange 404. The exchange 404 may be a service where integration applications are managed by an integration platform (e.g., the computing platform 112 of FIG. 1).

In some implementations, an integration application (e.g., the integration application 300 of FIG. 3) may run on a container 408 of FIG. 4. The container 408 may be provided by the integration platform via nexus 412. The nexus 412 may be managed by the integration platform and may be a location from which the container 408 is obtained. Since the integration platform provides the container 408, the container may be where testing of integration applications occurs, as described further below. Additionally, the integration platform may update the containers 408 and automatically verify that integration applications are running on the latest available container.

Also or alternatively, the containers 408 may store dependencies such that when integration applications are tested using different permutations of components (as described further below); result service 416 causes results of these tests to be stored in result database 420. As described above, having a large repository of such test results may confer benefits beyond those related to each individual integration application being tested. For example, certain combinations of components of integration applications may fail under a variety of circumstances. Therefore, maintaining the results database 420 may allow the integration platform to have data pertaining to millions of different integration application scenarios, providing a broad understanding of combinations of components.

Returning to FIG. 2, at 204, it may be determined that a new version of a component of the integration application is a candidate for release. For instance, returning to the above example, the integration platform (e.g., the computing platform 112 of FIG. 1) may automatically determine that the new version of the connector component used by the Briljula Forensics integration application is a candidate for release.

At 206 of FIG. 2, the integration application may be tested. By way of illustration, returning to the above example, the integration platform (e.g., the computing platform 112 of FIG. 1) may automatically begin testing the Briljula Forensics integration application in response to determining that the new version of the connector component is a candidate for release.

Such testing may occur in a variety of manners. By way of example, a test may be automatically run on integration an application using a first permutation of versions of each component of the integration application. After automatically testing the integration application using the first permutation of versions of each component of the integration application, the integration application may be changed to use a different permutation of versions of each component and the integration application may be tested using the different permutation of versions. This process may be repeated until every possible permutation of versions of the integration application has been tested.

By way of illustration, referring now to the general example depicted in FIG. 3, the integration application 300 of FIG. 3 has N components 304(1)-(N) each having $M_i$ versions 308. Test 1 312(1) may be run on a first permutation of versions of components 304(1)-(N). For example, the test 1 312(1) may be run on the integration application 300 using version 1 of each component 304. The test 1 312(1) may then be run on the integration application 300 using version 2 of component 1 304(1) and version 1 of all other components 304. This process may be repeated until each and every permutation of versions 308 of components 304 have been tested using the test 1 312(1).

Since there are Q tests, this process may be repeated where each permutation of versions 308 of components 304 may be tested for each of test 1 312(1) through test Q 312(Q).

Referring now to a simplified example depicted in FIG. 5, integration application 500 has two components 504(1) and 504(2). The component 504(1) has versions 508(1) 1-X (X being any arbitrary number). The component 504(2) has versions 508(2) 1-Y (Y being any arbitrary number). For example, test 1 512(1) may first be run on the integration application 500 using version 1 of component 1 504(1) and component 2 504(2). The test 1 512(1) may then be run on the integration application 500 using version 2 of component 1 504(1) and version 1 of component 2 504(2). The test 1 512(1) may then continue to be run on the integration application 500 using a different version 508(1) of component 1 504(1) and version 1 of component 2 504(2) until all X versions 508(1) of the component 1 504(1) have been tested with version 1 of component 2 504(2).

Once all X versions 508(1) of the component 1 504(1) have been tested with version 1 of component 2 504(2), the test 1 512(1) may then be run on the integration application 500 X further times using each of the X versions 508(1) of the component 1 504(1) along with version 2 of component 2 504(2). This process may be repeated until the test 1 512(1) has been run on the integration application 500 using all X versions 508(1) of the component 1 504(1) along with all Y versions 508(2) of component 2 504(2).

The above process may be repeated for test 2 512(2) such that test 2 512(2) has been run on the integration application 500 using all X versions 508(1) of the component 1 504(1) along with all Y versions 508(2) of component 2 504(2). Similarly, the above process may be repeated for test 3 512(3) such that test 3 512(3) has been run on the integration application 500 using all X versions 508(1) of the component 1 504(1) along with all Y versions 508(2) of component 2 504(2).

Returning to FIG. 2, at 208, the integration application may be caused to be upgraded. By way of example, if the test(s) performed at 206 determine that the integration application 300 of FIG. 3 executes properly with the new version of the component, then the integration application may be automatically upgraded to include the new version of the component.

Also or alternatively, if the integration application fails any of the test(s) at 206, a failure report may be automatically generated responsive to the failure. By way of illustration, responsive to a failure associated with a test of the integration application 300 of FIG. 3, the integration platform (e.g., the computing platform 112 of FIG. 1) may automatically generate and store a report of the results of the test in the results database 420 of FIG. 4. In the event of this failure, the integration application 300 of FIG. 3 may be automatically added to an exclusion list.

Referring now to FIG. 6, method 600 may be performed on integration application 602, which may be any type of integration application described herein such as the integration application 300 of FIG. 3. The integration application 602 of FIG. 6 may have one or more components that have been changed and the method 600 may be performed on integration application 602 to test integration application 602, as described above.

At 604, it may be determined whether the integration application 602 is self-hosted or hosted by a computing platform (e.g., the computing platform 112 of FIG. 1). If the integration application 602 is self-hosted, method 600 may proceed to 608 where a container may be obtained (e.g., the container 408 of FIG. 4, as described above). In this case, if the integration application 602 is self-hosted, running on a customer infrastructure separate from the computing platform associated with the testing infrastructure, the integration application 602 may be automatically on-boarded to run on the container, at which point the method 600 may proceed to 620, and the container may be run.

Alternatively, if it is determined at 604 of FIG. 6 that the integration application 602 is hosted by the computing platform (e.g., the computing platform 112 of FIG. 1), the method 600 may proceed to 612 at which point the integration application 602 may be uploaded to an exchange (e.g., the exchange 404 of FIG. 4). In this case, if the integration application 602 is hosted by the computing platform, requirements may be configured by the computing platform, and the customer may not need to provide any configuration information. After requirements are configured, the method 600 may proceed to 620, and the container may be run.

At 624, it may be determined if a version of a component of the integration application 602 is defined. If it is determined that the version of the component of the integration application 602 is not defined, the method 600 may proceed to 628 and the latest version of the component of the integration application 602 may be used in testing at 632, as discussed below. Alternatively, if it is determined that the version of the component of the integration application 602 is defined, the method 600 may proceed directly to 632 at which point testing may be executed using the defined version of the integration application 602.

At 632 of FIG. 6, the integration application 602 is tested using the techniques described above in the context of 206 of FIG. 2. Once the integration application 602 is tested, the method 600 proceeds to 636.

If it is determined at 636 that there were not any problems associated with the results of the tests, the method 600 proceeds to 640 at which point the payload may be sent to a service API endpoint such that the integration application may be automatically updated to include the tested versions of the components. Additionally, the test results may be sent to a database (e.g., result service 416 of FIG. 4 may cause the results to be stored in the result database 420, as described above.)

Alternatively, if it is determined at 636 that there were problems with the tests, the method 600 proceeds to 640 at which point logs may be created and sent to a database (e.g., result service 416 of FIG. 4 may cause the results to be stored in the result database 420.)

Figure 7:
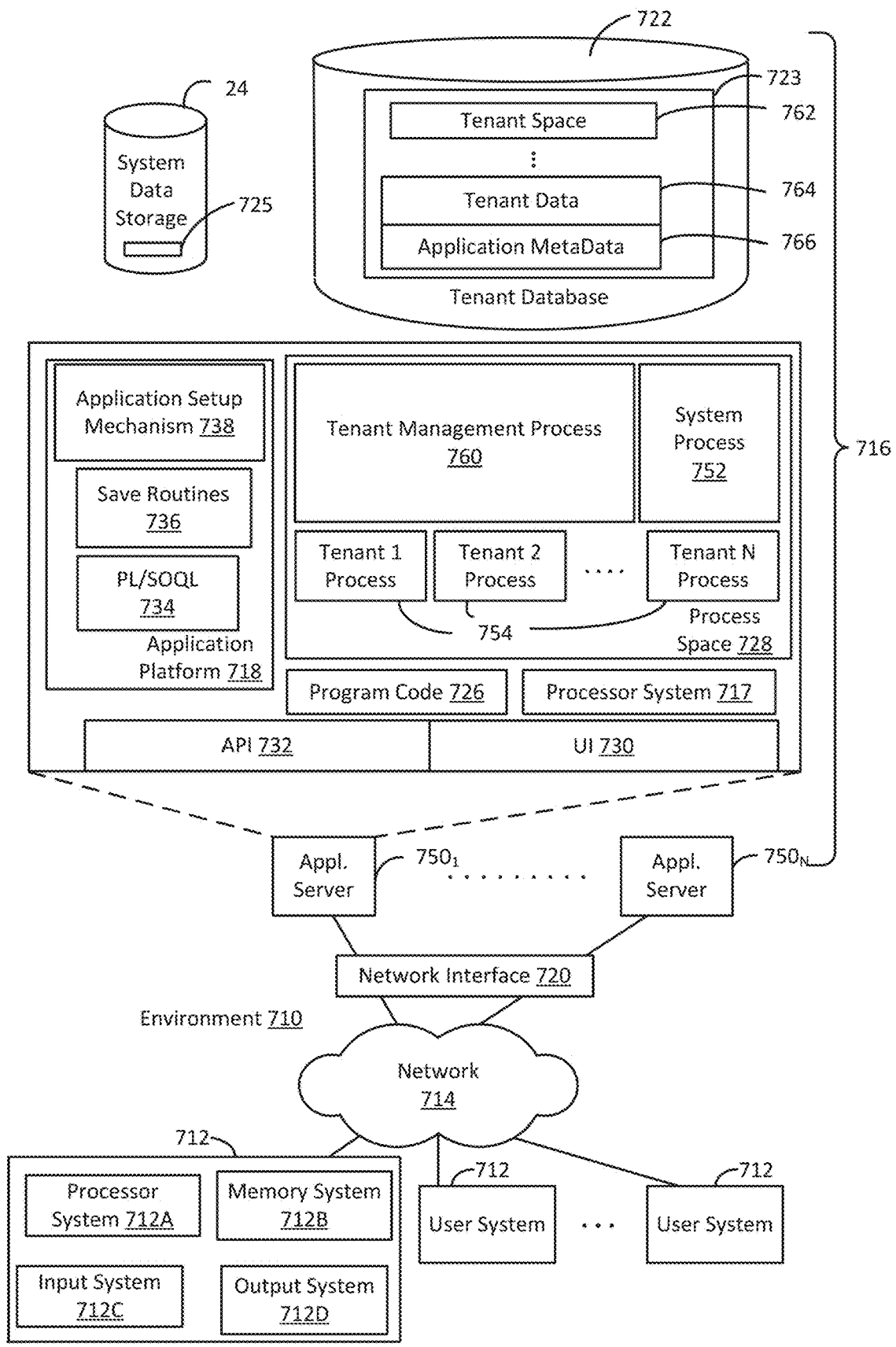
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based integration system. For example, in some implementations, system 716 may include application servers configured to implement and execute software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as an integration system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
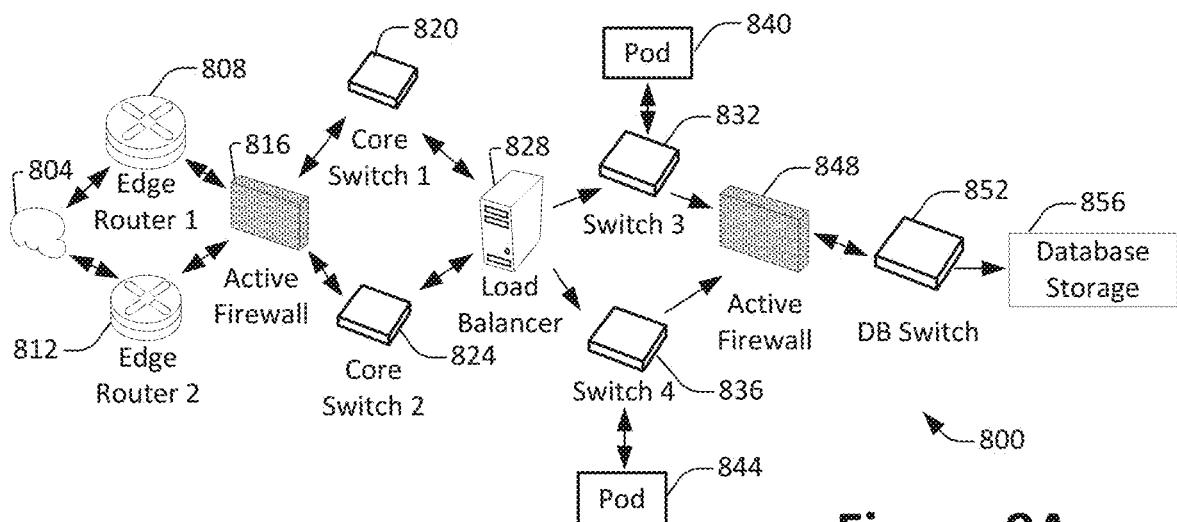
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
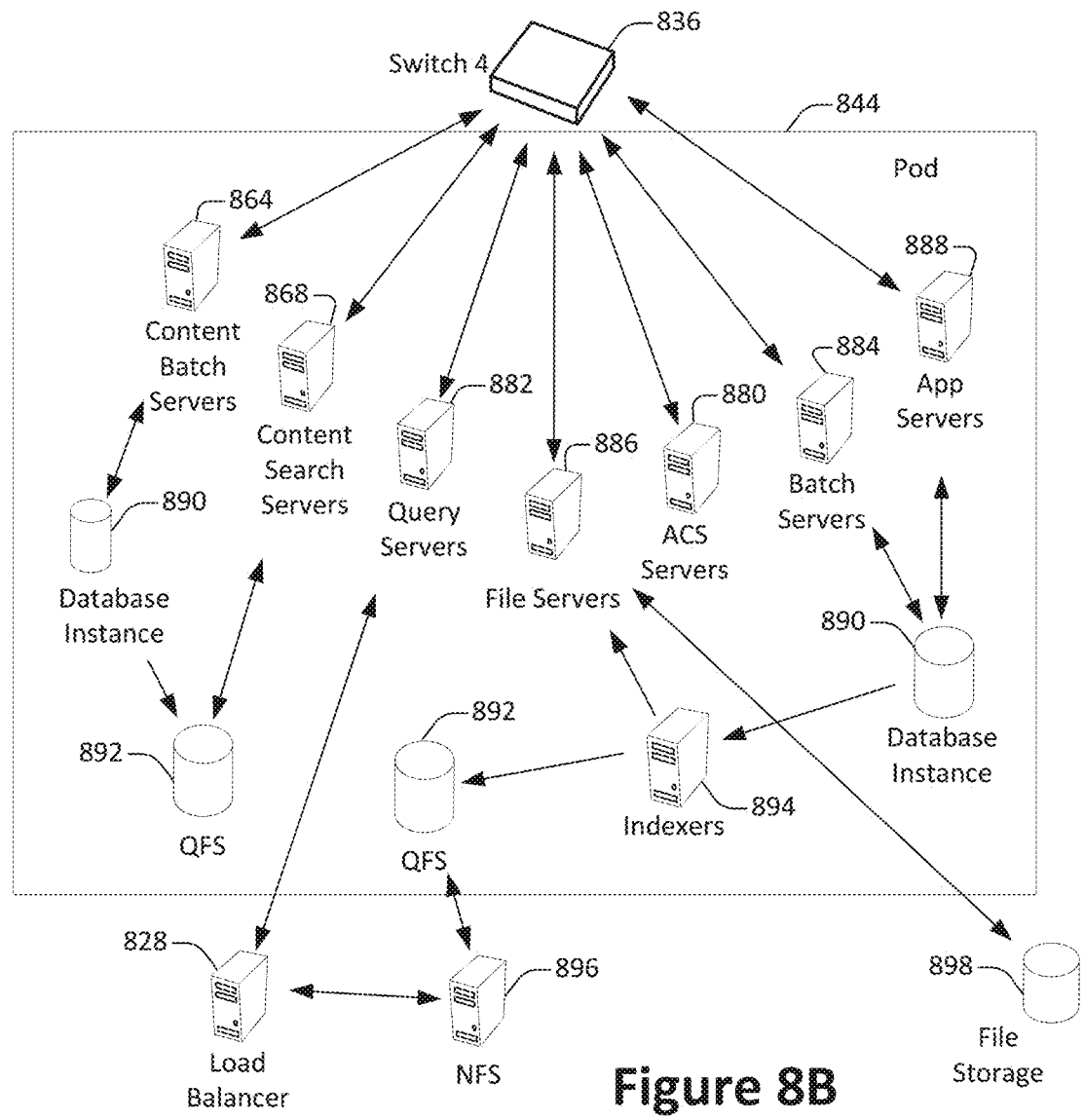
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBS), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
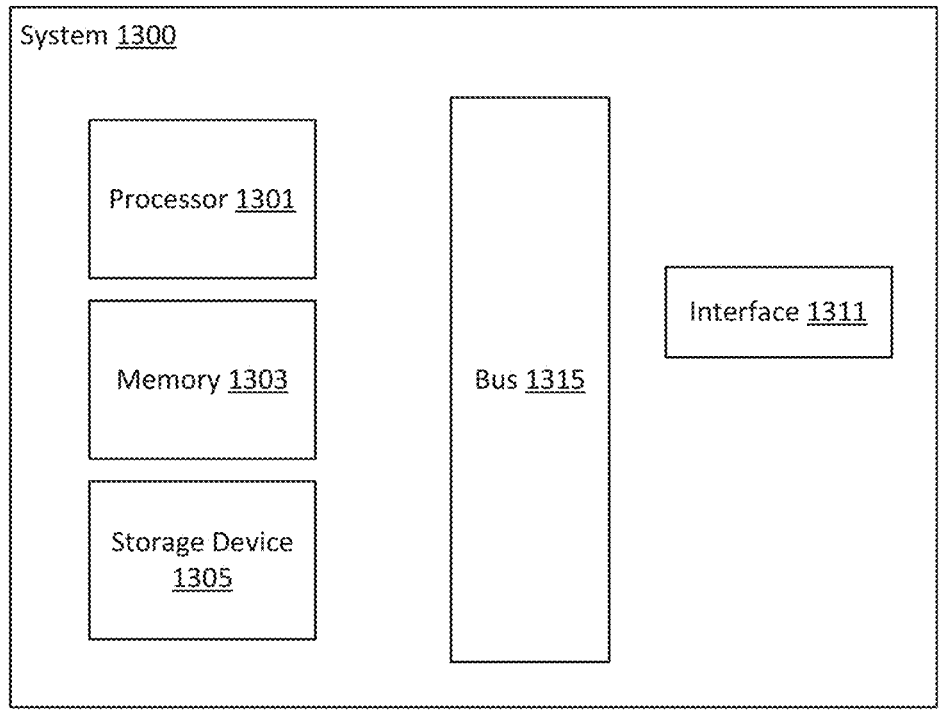
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A method comprising:
   providing, via a computing platform, an integration application comprising a plurality of components, the components providing connections between systems, the integration application configured to allow the systems to exchange data;
   determining whether the integration application is self-hosted or hosted by the computing platform;
   uploading the integration application to an exchange according to a result of the determining whether the integration application is self-hosted or hosted by the computing platform;
   determining, using one or more processors, that a new version of a first component of the components is a candidate for release;
   prior to the release of the new version of the first component, and responsive to determining that the new version of the first component is the candidate for the release, testing, using the one or more processors, the integration application using the new version of the first component;
   automatically causing, based on results of the testing the integration application, an instance of the integration application to be upgraded to include the new version of the first component;
   running a further test on the integration application; and
   responsive to a failure associated with the further test:
   automatically generating and storing a report of results of the further test; and
   automatically adding the integration application to an exclusion list.

2. The method of claim 1, wherein the testing the integration application comprises:
   automatically testing the integration application using each permutation of versions of each component of the integration application.

3. The method of claim 2, wherein the automatically testing the integration application using each permutation of versions of each component of the integration application comprises:
   automatically testing the integration application using a first permutation of versions of each component of the integration application; and
   after the automatically testing the integration application using the first permutation of versions of each component of the integration application, automatically changing the integration application to use a different permutation of versions of each component of the integration application and testing the integration application using the different permutation of versions of each component of the integration application until all permutations of versions have been tested.

4. The method of claim 1, wherein the computing platform is provided to a plurality of organizations via an on-demand computing environment, the integration application being implemented by a first one of the organizations.

5. The method of claim 4, wherein the testing of the integration application is one of a plurality of tests configurable by authorized users associated with an organization implementing the computing platform.

6. The method of claim 5, further comprising:
maintaining a results database, the results database storing the results for the testing of the integration application and storing further results of further tests of further integration applications associated with the plurality of organizations.

7. The method of claim 6, wherein the integration application is configured to run on a container associated with the computing platform regardless of whether the first organization uses a first infrastructure associated with the computing platform or the first organization uses a second infrastructure native to the first organization.

8. A computing platform comprising one or more processors and a memory, the computing platform being configured to cause:
providing, via a computing platform, an integration application comprising a plurality of components, the components providing connections between systems, the integration application configured to allow the systems to exchange data;
determining whether the integration application is self-hosted or hosted by the computing platform;
uploading the integration application to an exchange according to a result of the determining whether the integration application is self-hosted or hosted by the computing platform;
determining, using the one or more processors, that a new version of a first component of the components is a candidate for release;
prior to the release of the new version of the first component, and responsive to determining that the new version of the first component is the candidate for the release, testing, using the one or more processors, the integration application using the new version of the first component and an existing version of the first component;
automatically causing, based on results of the testing the integration application, an instance of the integration application to be upgraded to include the new version of the first component;
running a further test on the integration application; and
responsive to a failure associated with the further test:
automatically generating and storing a report of results of the further test; and
automatically adding the integration application to an exclusion list.

9. The computing platform of claim 8, wherein the testing the integration application comprises:
automatically testing the integration application using each permutation of versions of each component of the integration application.

10. The computing platform of claim 9, wherein the automatically testing the integration application using each permutation of versions of each component of the integration application comprises:
automatically testing the integration application using a first permutation of versions of each component of the integration application; and
after the automatically testing the integration application using the first permutation of versions of each component of the integration application, automatically changing the integration application to use a different permutation of versions of each component of the integration application and testing the integration application using the different permutation of versions of each component of the integration application until all permutations of versions have been tested.

11. The computing platform of claim 8, wherein the computing platform is provided to a plurality of organizations via an on-demand computing environment, the integration application being implemented by a first one of the organizations.

12. The computing platform of claim 11, wherein the testing of the integration application is one of a plurality of tests configurable by authorized users associated with an organization implementing the computing platform.

13. The computing platform of claim 12, the computing platform further configured to cause:
maintaining a results database, the results database storing the results for the testing of the integration application and storing further results of further tests of further integration applications associated with the plurality of organizations.

14. The computing platform of claim 13, wherein the integration application is configured to run on a container associated with the computing platform regardless of whether the first organization uses a first infrastructure associated with the computing platform or the first organization uses a second infrastructure native to the first organization.

15. A non-transitory computer-readable medium comprising computer-readable program code executable by one or more processors, the program code comprising instructions configured to cause the one or more processors to perform a method comprising:
providing, via a computing platform, an integration application comprising a plurality of components, the components providing connections between systems, the integration application configured to allow the systems to exchange data;
determining whether the integration application is self-hosted or hosted by the computing platform;
uploading the integration application to an exchange according to a result of the determining whether the integration application is self-hosted or hosted by the computing platform;
determining, using the one or more processors, that a new version of a first component of the components is a candidate for release;
prior to the release of the new version of the first component, and responsive to determining that the new version of the first component is the candidate for release, testing, using the one or more processors, the integration application using the new version of the first component and an existing version of the first component;
automatically causing, based on results of the testing the integration application, an instance of the integration application to be upgraded to include the new version of the first component;
running a further test on the integration application; and
responsive to a failure associated with the further test:
automatically generating and storing a report of results of the further test; and
automatically adding the integration application to an exclusion list.

16. The non-transitory computer-readable medium of claim 15, wherein the testing the integration application comprises:
automatically testing the integration application using each permutation of versions of each component of the integration application.

17. The non-transitory computer-readable medium of claim 16, wherein the automatically testing the integration application using each permutation of versions of each component of the integration application comprises:
- automatically testing the integration application using a first permutation of versions of each component of the integration application; and
- after the automatically testing the integration application using the first permutation of versions of each component of the integration application, automatically changing the integration application to use a different permutation of versions of each component of the integration application and testing the integration application using the different permutation of versions of each component of the integration application until all permutations of versions have been tested.

* * * * *